Dec. 10, 1935.  J. KUCHAR  2,023,960
SIDE DUMP WAGON
Filed Feb. 19, 1932  2 Sheets-Sheet 1

Inventor
Joseph Kuchar
By Williams, Bradbury,
McCaleb & Hinkle
Attys

Dec. 10, 1935.   J. KUCHAR   2,023,960
SIDE DUMP WAGON
Filed Feb. 19, 1932   2 Sheets-Sheet 2
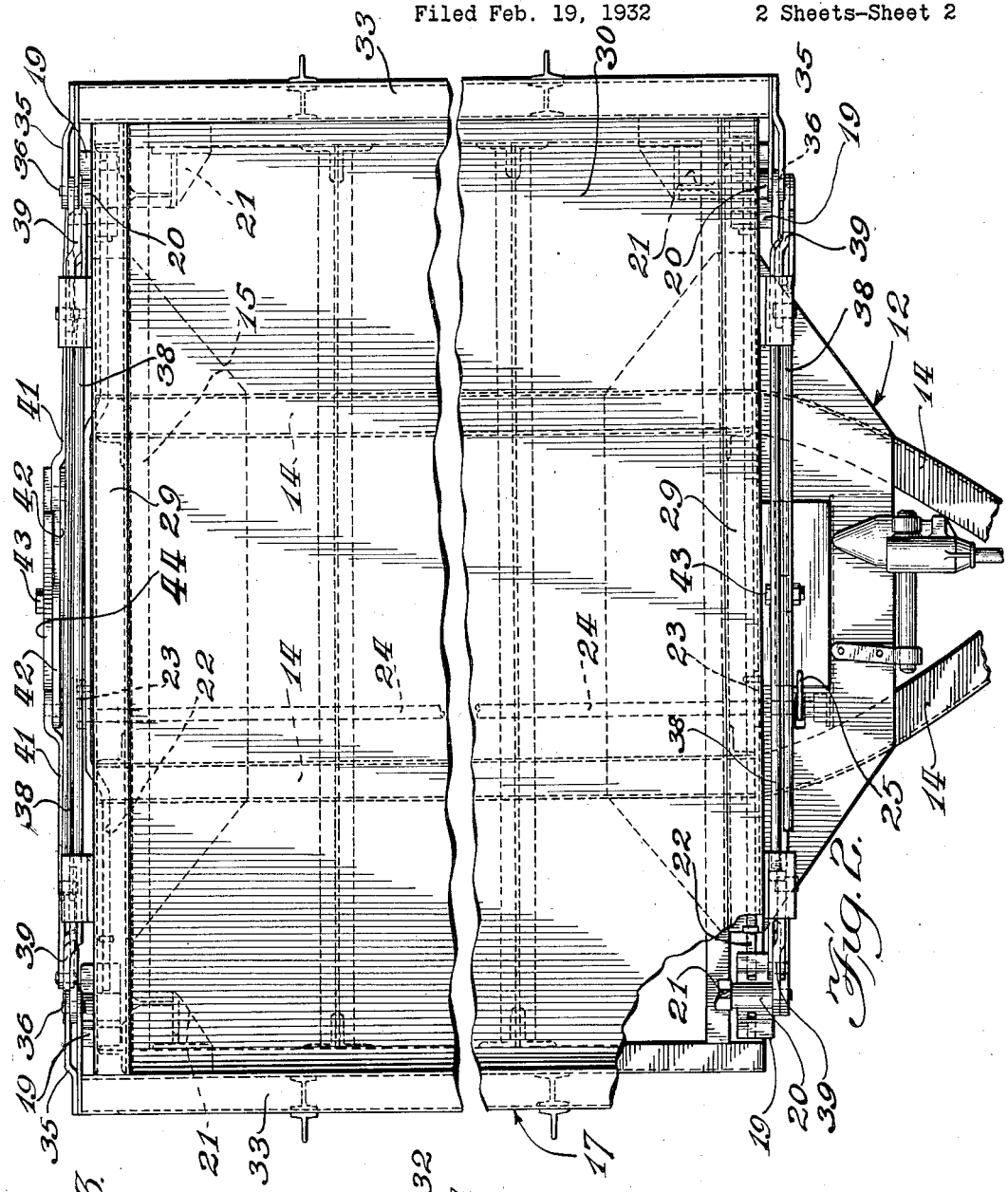
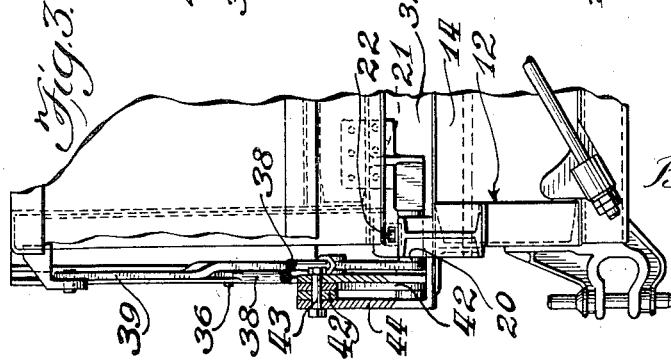
Inventor
Joseph Kuchar
By Williams, Bradbury,
McCaleb & Hinkle.
Attys.

Patented Dec. 10, 1935

2,023,960

UNITED STATES PATENT OFFICE 2,023,960

SIDE DUMP WAGON

Joseph Kuchar, Chicago, Ill., assignor to Athey Truss Wheel Co., Chicago, Ill., a corporation of Illinois Application February 19, 1932, Serial No. 593,962

10 Claims. (Cl. 298—18)

This invention relates to side dump wagons and particularly to such wagons which are provided with gates which automatically open when the wagon is tilted to dump the load.

One of the objects of the invention is to provide an improved wagon of this type.

A further object of the invention is to provide a dumping wagon having an improved gate opening linkage operable to open a gate when the wagon is tilted in one direction and inoperative when the wagon is tilted in the opposite direction.

A further object of the invention is to provide a dump wagon having gates which automatically open to their fullest extent when the load is tilted through a relatively small angle.

A further object of the invention is to provide a dump wagon of this type having a linkage controlling the opening of a gate, which linkage is capable of independent movement after the gate is fully open.

A further object of the invention is to provide a dump wagon having linkages for automatically opening the gates when the wagon is tilted which are inexpensive to construct, which are simple, durable and effective in operation.

Other objects, advantages and capabilities of the invention will appear from the following description of preferred embodiments thereof taken in conjunction with the accompanying drawings, in which Figure 1 is an end view of a wagon embodying my invention;

Fig. 2 is a plan view thereof, and

Fig. 3 is an elevational detail view showing the location of the linkages.

Figure 1:
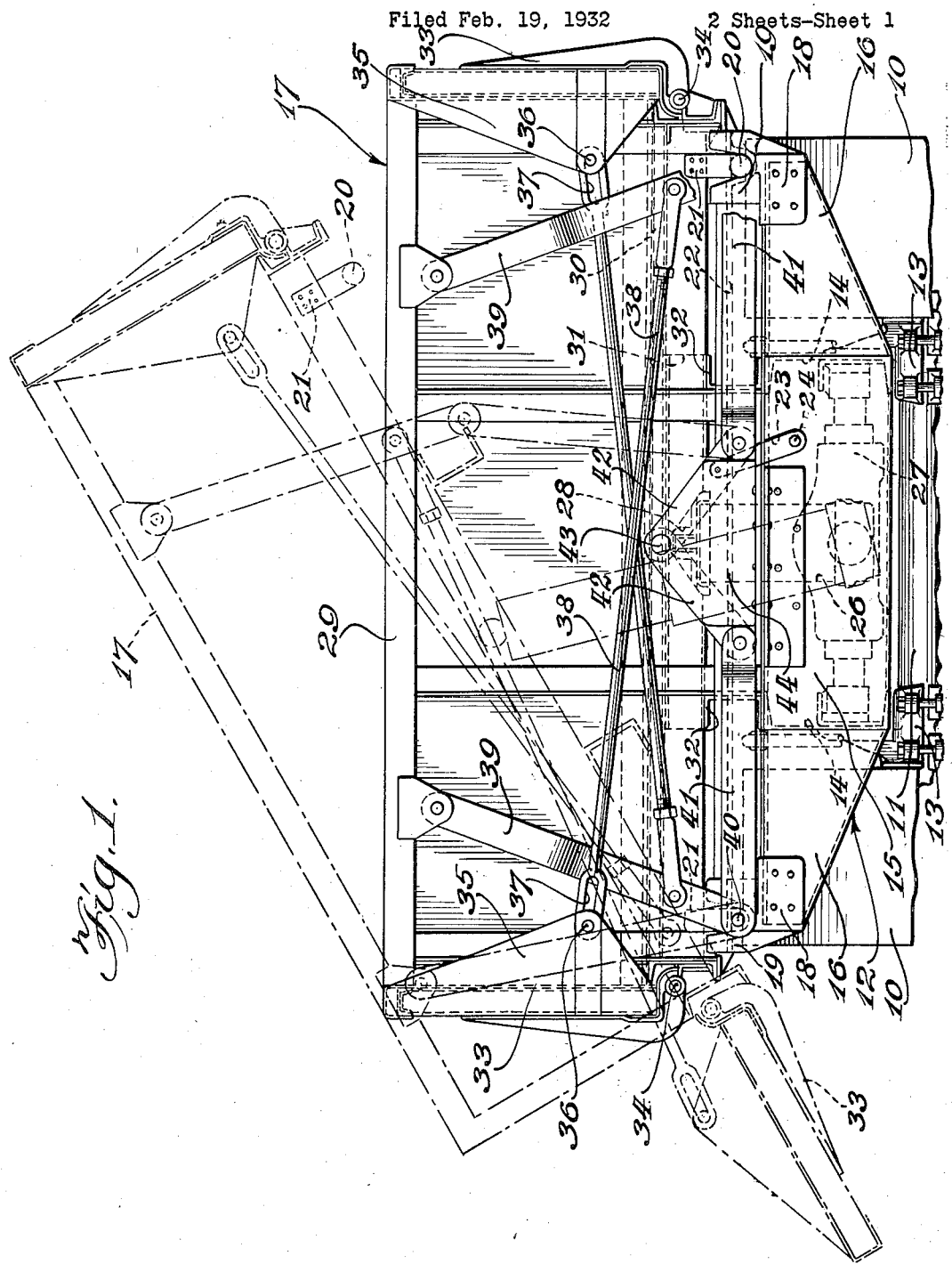

Referring to the drawings the reference numeral 10 designates the wagon wheels, which may suitably be of the track-laying type. These wheels support an axle 11 upon which the wagon frame or chassis 12 is mounted, for example by means of brackets 13.

The frame or chassis 12 comprises two main longitudinal members 14 which may suitably be channels directed inwardly. The channels 14 converge at their forward ends as shown in Fig. 2. Their rear ends are connected by a transverse beam or member 15 which extends on either side beyond the channels 14 and provides brackets 16. Adjacent the forward end of the body 17 the chassis 12 carries brackets 18 which project outwardly into alignment with the brackets 16. It will be understood that the chassis 12 comprises transverse members connecting the channels 14 and other elements which it is thought unnecessary to describe in detail.

Each of the brackets 16 and 18 carries a bracket 19 which is provided with a longitudinal recess for the reception of the fulcrum 20 which may be carried by a bracket 21 secured to the underside of the body 17. Each forward and rear pair of brackets 19 is provided with transverse openings above the normal position of the fulcrum 20 and these openings receive transverse sliding bars 22 which have a pin and slot connection with arms 23 which are mounted upon a shaft 24 which extends longitudinally and is mounted on the frame. The shaft 24 carries a lever 25 at its forward end. It will readily be understood that by throwing the lever 25 to the left or right the bars 22 are similarly thrown and lock the fulcrums 20 on the side to which they are thrown. Consequently, if the ram 26 is expanded in the usual manner, for example by admission of air or liquid under pressure thereinto the body will tilt about the fulcrums 20 which are locked in the brackets 21. The ram 26 may be pivotally mounted upon a transverse member 27 carried by the frame and may be pivotally secured to the body at the position 28, preferably substantially in the center of the body.

The body 17 comprises end walls 29 and a bottom 30 which is supported on a sub-structure 31 which in turn is supported by longitudinal channels 32 which are adapted to rest upon the upper webs of the channels 14 when the body is in its normal position. The body is provided with side gates 33 which are pivoted adjacent their lower ends by means of pivots 34.

Means are provided whereby the gate on the dumping side is automatically opened when the body is tilted. This means comprises linkages which will now be described. Each gate 33 is provided at each end with an inwardly extending web or flange 35 which carries a pivot pin 36 at a point substantially above the gate pivots 34. The pins 36 are operatively received in slots 37 and the ends of links 38 which extend transversely away from the pins 36 to the opposite side of the wagon body where they are pivotally connected to links or levers 39. The links or levers 39 are pivotally mounted on the end walls of the body adjacent the upper end thereof and extend downwardly so as to bring their ends into substantial alignment with the fulcrums 20 on each side of the body. At their lower ends the links or levers 39 are pivoted at 40 to links 41 which extend inwardly and terminate short of the center of the body. The inner end of each link 41 is pivoted to a link 42 which extends inwardly and upwardly to the point 43 at the center of the wagon where they are pivoted to a bracket 44, one of which is mounted at each end of the wagon body upon the chassis 12.

Referring to Fig. 1 it will be noted that the links 39 and 41 on the right-hand side, which are connected to the gate 33 on the left-hand side form an acute angle. When the body tilts to the left towards the position indicated in dot-and-dash lines in that figure, this angle becomes greater and the link 41 rotates about its common pivot with link 42, the adjacent ends being supported upon the bracket 44. The link or lever 39 consequently swings to the left as viewed in Fig. 1 and moves the link 38 connected to the left-hand gate in that direction. This gate opens under its weight and under the action of the load until it becomes fully opened when it abuts against the body and is held against further movement relative thereto. This condition is shown in dot-and-dash lines in Fig. 1. As the body continues to tilt the link 41 pulls the link 42 upwardly about the pivot 43 until the ram 26 reaches its maximum throw, at which time the links 39, 41 and 42 occupy a position to the right of the line joining the upper pivot of the link or lever 39 to the pivot 43.

When the ram 26 is permitted to collapse towards the position shown in dot-and-dash lines in Fig. 1 the link 42 returns to its normal position, so that its end rests on the bracket 44. The link 42 thus serves primarily in the replacement of the linkage and insures the correct location of the inner pivot of the link 41. It will readily be apparent that as the body returns from the position shown in dot-and-dash lines in Fig. 1 to its full line position, the links 39 and 41 likewise return to their full line position and the gate 33 is thereby closed.

During the above described dumping and return movements of the body, the gate 33 on the right-hand side, as viewed in Fig. 1, retains its normal closed position with respect to the body. The pivot points 40 of the linkage connected to the right-hand gate 33 are in alignment with the fulcrums 20 about which the body is turning. Consequently the links or levers 39 to which the right-hand gate 33 is connected do not move relative to the body and said gate is not permitted to move from its closed position.

Although the invention has been disclosed in connection with the specific details of a preferred embodiment thereof, such details are not intended to be limitative of the invention except in so far as set forth in the accompanying claims.

I claim:

1. A wagon comprising a chassis, a body mounted thereon adapted to dump to either side about spaced fulcrums, a gate pivotally mounted adjacent its lower edge on each side of the body, a tension link having a connection with a gate above the hinge of the gate, adapted to permit limited free movement between the gate and the link, a lever pivoted on the body, said link being pivotally connected thereto, a second link pivotally connected to the lower end of said lever, the common pivot of said lever and said second link being adapted to lie in alignment with the fulcrum remote from said gate when the body is in normal position, a third link pivotally connected to the said second link and to the chassis, said second and third links being provided with a seat on the chassis adjacent their common pivot so that when the body tilts about the fulcrum adjacent said gate, the last said links pivot about their common pivot, the resulting movement of the lever permitting opening movement of the gate.

2. A wagon comprising a chassis, a body supported thereon adapted to tilt to either side about spaced fulcrums, a gate on each side of the body, a linkage pivotally connected to the body and to the chassis and having a joint normally in alignment with the fulcrum remote from one gate, a link connecting said linkage to said gate so that when the body is tilted about the fulcrum adjacent said gate, the gate is permitted to open fully when the body is tilted through a small angle, said link comprising means providing lost motion to accommodate the movement thereof relative to the gate after the same is fully opened.

3. A wagon comprising a chassis, a body adapted to tilt thereon to either side about spaced fulcrums, a gate pivotally connected adjacent its lower edge to each side of the body, a link having a connection with said gate above its hinged axis which provides for lost motion between the link and the gate, said link extending inwardly across the end of the body, a lever pivotally mounted on the body remote from said gate extending downwardly and having said link pivotally connected thereto, and a linkage pivotally connected to the chassis and to said lever, the pivot of the lever therewith being normally located in alignment with the fulcrum remote from said gate.

4. A wagon comprising a chassis, a body adapted to tilt thereon to either side about spaced fulcrums, a gate pivotally connected adjacent its lower edge to each side of the body, a link having a connection with said gate above its hinged axis which provides for lost motion between the link and the gate, said link extending inwardly across the end of the body, a lever pivotally mounted on the body remote from said gate extending downwardly and having said link pivotally connected thereto, a second link pivotally connected to said lever and a third link pivotally connected to the chassis, the common pivot of said lever and the second said link being normally located in alignment with the fulcrum remote from said gate, the chassis being provided adjacent the common pivot of the second and third links with means providing a support for said links whereby said links pivot about said common pivot which maintains a stationary position during the initial tilting movement of the body about the fulcrum adjacent said gate.

5. A wagon comprising a chassis, a body adapted to tilt thereon to either side about spaced fulcrums, a gate pivotally connected adjacent its lower edge to each side of the body, a link having a connection with said gate above its hinged axis which provides for lost motion between the link and the gate, said link extending inwardly across the end of the body, a lever pivotally mounted on the body remote from said gate extending downwardly and having said link pivotally connected thereto, a second link pivotally connected to said lever and a third link pivotally connected to the said link and to the chassis at substantially the central point thereof, the common pivot of said lever and the second said link being normally located in alignment with the fulcrum remote from said gate, the chassis being provided adjacent the common pivot of the second and third links with means providing a support for said links whereby said links pivot about said common pivot which maintains stationary position during the initial movement about the fulcrum adjacent said gate.

6. A wagon comprising a chassis, a body mounted thereon adapted to tilt to either side about spaced fulcrums, a gate hinged adjacent its lower edge to each side of the body, a linkage pivotally connected to said body and to said chassis and having a joint normally in alignment with one of said fulcrums, a link pivotally connected to said linkage and having a lost motion connection with the gate remote from said fulcrum, the linkage being arranged so that the gate is adapted to open when the body is tilted through a relatively small angle, the lost motion connection permitting movement of the linkage independently of the gate during the remainder of the tilting operation.

7. A wagon comprising a chassis, a body mounted thereon and adapted to tilt to either side about spaced fulcrums, a gate pivotally mounted adjacent its lower edge on each side of the body, said gates and body having abutments which engage when the gates are open, an articulated linkage connected to said body on either side of the center line and to the chassis, a tension link connecting each linkage with the gate on the opposite side of the body, the connection between said gate and tension link providing for lost motion.

8. A wagon comprising a chassis, a body mounted thereon and adapted to tilt to either side about spaced fulcrums, a gate pivotally mounted adjacent its lower edge on each side of the body, said gates and body having abutments which engage when the gates are open, an articulated linkage connected to said body on either side of the center line and to the chassis, a tension link connecting each linkage with the gate on the opposite side of the body, each linkage having a joint in alignment with the fulcrum remote from the gate to which it is connected, the connection between said gate and tension link providing for lost motion.

9. A wagon comprising a chassis, a body mounted thereon and adapted to tilt to either side about spaced fulcrums, a gate pivotally mounted adjacent its lower edge on each side of the body, an articulated linkage connected to said body on either side of the center line and to the chassis, a tension link connecting each linkage with the gate on the opposite side of the body, the connection between said gate and tension link providing for lost motion, the linkage elements and said tension link being proportioned and correlated to permit a gate to open fully during the initial tilting movement of the body.

10. A wagon comprising a chassis, a body mounted thereon and adapted to tilt to either side about spaced fulcrums, a gate pivotally mounted adjacent its lower edge on each side of the body, an articulated linkage connected to said body on either side of the center line and to the chassis, a tension link connecting each linkage with the gate on the opposite side of the body, each linkage having a joint in alignment with the fulcrum remote from the gate to which it is connected, the connection between said gate and tension link providing for lost motion, the linkage elements and said tension link being proportioned and correlated to permit a gate to open fully during the initial tilting movement.

JOSEPH KUCHAR.